US008915473B1

(12) United States Patent
Baghdasarian

(10) Patent No.: US 8,915,473 B1
(45) Date of Patent: Dec. 23, 2014

(54) HOLD-DOWN MECHANISM FOR A SPACECRAFT APPENDAGE

(75) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 461 days.

(21) Appl. No.: 13/237,761

(22) Filed: Sep. 20, 2011

(51) Int. Cl.
*B64G 1/22* (2006.01)

(52) U.S. Cl.
USPC ...................................... 244/172.6

(58) Field of Classification Search
CPC ................................ B64G 1/222; B64G 1/645
USPC ...................................... 244/172.6
See application file for complete search history.

(56) References Cited

U.S. PATENT DOCUMENTS

| | | | | |
|---|---|---|---|---|
| 4,491,446 A * | 1/1985 | Ewald | ............................. | 410/32 |
| 5,002,418 A * | 3/1991 | McCown et al. | ............... | 403/24 |
| 5,125,601 A * | 6/1992 | Monford, Jr. | ............... | 244/173.1 |
| 5,439,310 A * | 8/1995 | Evenson et al. | ............... | 403/321 |
| 5,748,066 A * | 5/1998 | Holt | ................................. | 337/1 |
| 6,133,818 A * | 10/2000 | Hsieh et al. | .................... | 337/401 |
| 6,747,541 B1 * | 6/2004 | Holt et al. | ..................... | 337/401 |
| 2003/0076215 A1 * | 4/2003 | Baghdasarian | ............... | 337/401 |

* cited by examiner

*Primary Examiner* — Isam Alsomiri
*Assistant Examiner* — Justin Benedik
(74) *Attorney, Agent, or Firm* — Weaver Austin Villeneuve & Sampson LLP

(57) ABSTRACT

A hold-down mechanism for a steerable spacecraft appendage, the appendage being coupled to a spacecraft structure with a positioning mechanism, is configured (1) to support, when in a hold-down mode, the appendage at a first position substantially fixed with respect to the spacecraft; (ii) release, upon receipt of a signal, the appendage, thereby enabling the positioning mechanism to steer the spacecraft appendage; and (iii) retract from the appendage without regard to whether the appendage remains substantially in the first position. The first position may result in the spacecraft appendage being aligned in a nominal operating location and orientation, so that the antenna positioning mechanism is not required to initially deploy or otherwise reorient the appendage.

21 Claims, 7 Drawing Sheets

HOLD-DOWN MECHANISM FOR A SPACECRAFT APPENDAGE

TECHNICAL FIELD

This invention relates generally to spacecraft and, in particular, to an improved hold-down mechanism for a spacecraft appendage.

BACKGROUND OF THE INVENTION

The assignee of the present invention manufactures and deploys spacecraft for communications and broadcast services. Such spacecraft commonly include various appendages, such as, for example, antenna reflectors, that may need to be deployable and/or steerable after the spacecraft is deployed on orbit. It is known in the art to provide an antenna positioning mechanism (APM), for example, to enable the appendage to be rotated with respect to the spacecraft about one or more axes for deployment and/or steering. On orbit, therefore, the APM may be the primary, or only, mechanical interface between the appendage and the spacecraft. Such mechanisms, however, are not commonly able to withstand launch environments when loaded with the appendage. Instead, hold-down mechanisms are conventionally provided which support the appendage during launch. Once the spacecraft has achieved orbit, the hold-down mechanism is "released" by, for example, severing a mechanical rod or bolt attaching the hold-down mechanism to the appendage, or by actuating a non-pyrotechnic release device such as that described in U.S. Pat. No. 6,133,818, to Hsieh, et al., assigned to the assignee of the present invention, and incorporated by reference herein in its entirety. Once the hold-down mechanism is released, the APM is enabled to deploy and/or steer the reflector or other appendage.

An example of a conventional hold-down mechanism 100 is illustrated in FIG. 1. Mechanism 100 includes frame 101 that may be attached to a spacecraft (not shown) by way of hinges 103. Prior to release of the hold-down mechanism, an attachment member 110 of a spacecraft appendage (not shown) is secured to the spacecraft by hold-down mechanism 100. Rod 105, for example may connect attachment member 110 to frame 101. When hold-down mechanism 100 is to be released, release device/cutter 106 releases or severs rod 105, thereby permitting attachment member 110 and the spacecraft appendage to be deployed away (vertically, in the illustrated view) from the hold-down mechanism 100. Thereafter, frame 101 may be retracted by rotating frame 101 about an axis of hinges 103 so that frame 101 is folded against a sidewall of the spacecraft, thereby expanding the range of motion available to the spacecraft appendage.

SUMMARY OF INVENTION

The present inventor has recognized that a spacecraft appendage may be advantageously secured to the spacecraft, during launch and/or ground operations, by way of a hold-down mechanism that is configured to release the appendage without requiring the appendage to be moved away from the hold-down. The appendage, which may be an antenna reflector or other payload element coupled to the spacecraft with a positioning mechanism, may be supported, during launch or other dynamic environment, at its nominal (on-orbit) operational position by a structurally stiff hold-down mechanism that isolates the positioning mechanism from launch loads reacted through the appendage. The hold-down mechanism, upon releasing the appendage, retracts away from the appendage. As a result, a requirement to move the appendage prior to retracting the hold-down mechanism is obviated.

In an embodiment, a hold-down mechanism is provided for a steerable spacecraft appendage that is coupled to a spacecraft structure with a positioning mechanism. The hold-down mechanism is configured to: (i) support, when in a hold-down mode, the appendage at a first position substantially fixed with respect to the spacecraft; (ii) release, upon receipt of a signal, the appendage, thereby enabling the positioning mechanism to steer the spacecraft appendage; and (iii) retract from the appendage without regard to whether the appendage remains substantially in the first position.

In a further embodiment, the hold-down mechanism may be configured to retract from the appendage while the appendage remains substantially in the first position. The first position may result in the spacecraft appendage being aligned in a nominal operating location and orientation, so that the antenna positioning mechanism is not required to initially deploy or otherwise reorient the appendage.

In a further embodiment, the hold down mechanism includes a release device configured to prevent, in a first state, relative motion of the appendage with respect to the hold-down mechanism, and, in a second state, permit relative motion of the appendage with respect to the hold-down mechanism. In some implementations, the release device may be a split-spool device. In other implementations, the release device may be a pyrotechnic device.

In an embodiment, the hold-down mechanism may include a frame, hingedly attached, at an inboard portion, to the spacecraft structure, and detachably engaged, at an outboard portion, to a structural element of the appendage. The hold down mechanism may include a deployment spring configured such that, upon release of the appendage, the deployment spring drives a rotation of the frame about a hinge axis, thereby causing the hold-down mechanism to retract from the appendage. The frame may be detachably engaged to the structural element of the appendage by a cup and cone arrangement, the cup and cone arrangement being characterized by a longitudinal axis and a separation interface, wherein the longitudinal axis is perpendicular to a plane, and the plane passes through the separation interface and the hinge axis. In some implementations, the frame may include a convex cup configured to mate with a concave cone disposed on the structural element of the appendage. In other implementations, the frame may include a concave cone configured to mate with a convex cup disposed on the structural element of the appendage.

In another embodiment, the hold-down mechanism includes a frame, attached, at an inboard portion, to the spacecraft structure and detachably engaged, at an outboard portion, to a structural element of the appendage, where the frame includes a flexure. The flexure may be pretensioned and, upon release of the appendage, the flexure may drive a rotation of the frame about a flexure axis, thereby causing the hold-down mechanism to retract from the appendage.

In yet a further embodiment, a number of hold-down mechanisms for a steerable spacecraft appendage are provided, the appendage being coupled to a spacecraft structure with a positioning mechanism. The hold-down mechanisms are configured to: (i) support the appendage, during a dynamic environment, at a first position substantially fixed with respect to the spacecraft; (ii) release, upon receipt of a signal, the appendage, thereby enabling the positioning mechanism to steer the spacecraft appendage; and (iii) retract from the appendage without regard to whether the appendage remains substantially in the first position.

In an embodiment, each hold-down mechanism may include a respective frame, hingedly attached, at an inboard portion, to the spacecraft structure, and detachably engaged, at an outboard portion, to a respective interface of a structural element of the appendage.

In another embodiment, three hold down mechanisms may be provided, and the structural element may include a cruciform arrangement of a first longitudinal member and a second longitudinal member. A first end of the first longitudinal member may have an interface to a first respective frame, a second end of the first longitudinal member may have an interface to a second respective frame, a first end of the second longitudinal member may have an interface to a third respective frame, and a second end of the second longitudinal member may have an interface to the positioning mechanism. Each respective frame may be hingedly attached about a respective hinge axis, and a projection of each hinge axis onto a common plane may define a triangle. The triangle may be an equilateral triangle.

In an embodiment, the steerable spacecraft appendage may include an antenna reflector, and the structural element may be a reflector backup structure.

In a further embodiment, each hold-down mechanism may include a frame, attached, at an inboard portion, to the spacecraft structure and detachably engaged, at an outboard portion, to a structural element of the appendage, and each frame may include a flexure. The flexure may be pretensioned and, upon release of the appendage, the flexure may drive a rotation of the frame about a flexure axis, thereby causing the hold-down mechanism to retract from the appendage.

In an embodiment, each hold-down mechanism may include a respective frame detachably engaged, at an outboard portion, to a respective interface of a structural element of the appendage, and a release device is configured to prevent, in a first state, relative motion of the appendage with respect to the hold-down mechanisms, and, in a second state, permit relative motion of the appendage with respect to the hold-down mechanisms. The release device may include a cable configured, in the first state, to tension each frame so as to ensure engagement of the frame with the structural element. The release device may include a cable cutter configured, to cut, upon receipt of a signal, the cable, thereby permitting each frame to retract from the structural element.

In a yet further embodiment a spacecraft appendage hold-down and release method includes: (i) supporting a spacecraft appendage, with a hold-down mechanism, during a first first time period, at a first position substantially fixed with respect to the spacecraft, the appendage being coupled to a spacecraft structure with a positioning mechanism; (ii) releasing the appendage, subsequent to the first time period, thereby enabling the positioning mechanism to steer the spacecraft appendage; and (iii) retracting the hold-down mechanism from the appendage without regard to whether the appendage remains substantially in the first position.

In another embodiment, a dynamic environment encountered during the first time period includes at least one of a launch environment and a spacecraft dynamic test environment.

BRIEF DESCRIPTION OF THE DRAWINGS

Features of the invention are more fully disclosed in the following detailed description, reference being had to the accompanying drawings, in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Figure 1B:
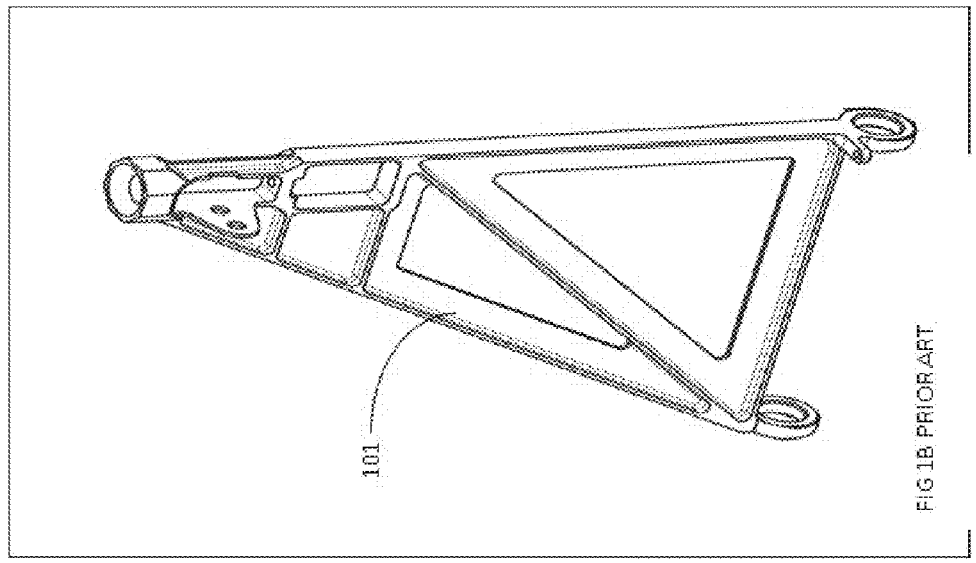
FIGS. 1A and 1B illustrate a known hold-down mechanism.
Figure 1A:
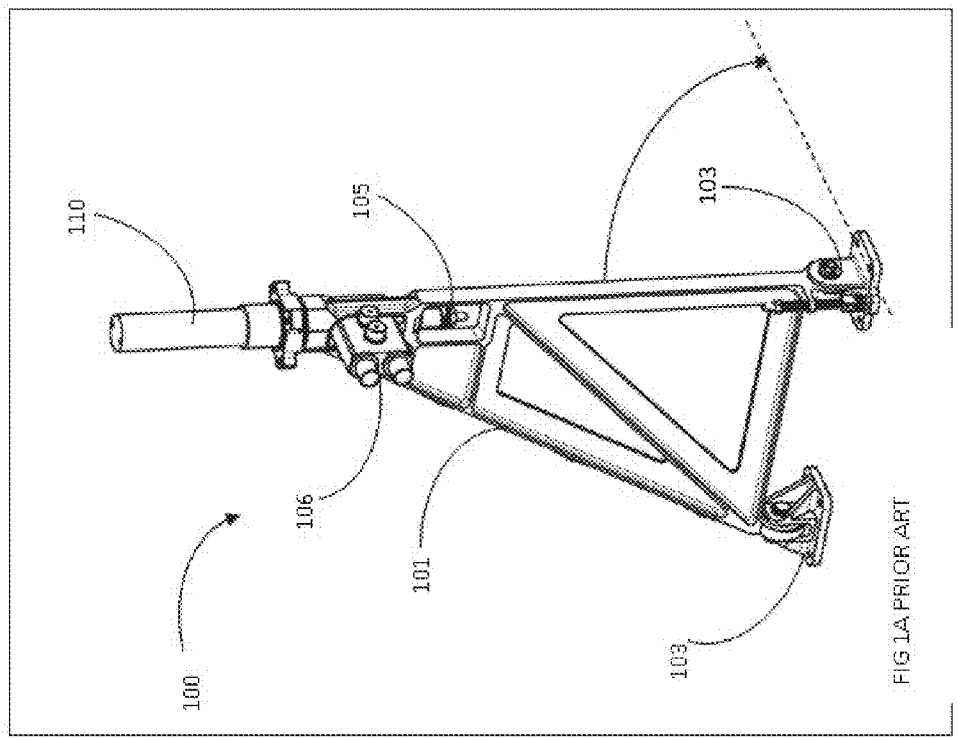
Figures 2A, 2B:
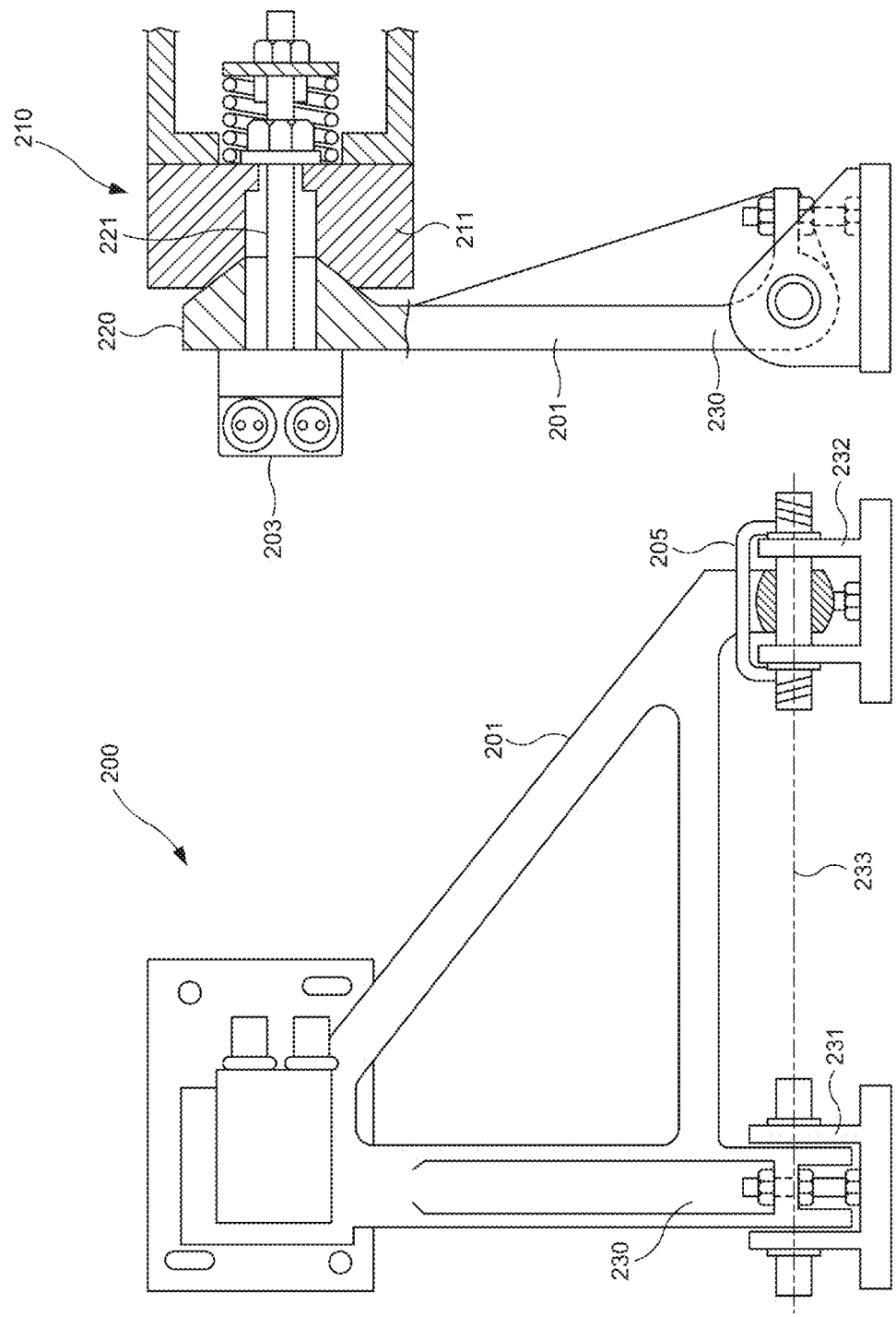
FIG. 2 illustrates an example of a hold-down mechanism according to an implementation of the disclosed techniques.

According to an embodiment of the presently disclosed techniques, referring now to FIG. 2, hold-down mechanism 200 is configured to support, when in a "hold-down" mode, a spacecraft appendage during dynamic environments such as a launch environment, dynamic environmental testing, or other spacecraft ground operation. FIG. 2A illustrates what may be termed a front elevation view of hold-down mechanism 200, whereas FIG. 2B illustrates what may be termed a side elevation view of hold-down mechanism 200, together with a structural element 210 of a spacecraft appendage (not illustrated). The spacecraft appendage may be, for example, a spacecraft antenna reflector, or other payload element coupled to a spacecraft structure with a positioning mechanism (not shown). In an embodiment, hold-down mechanism 200 may include frame 201 which may have an interface for detachably engaging, at an outboard portion 220, with structural element 210 of the appendage. Frame 201 may, further, be attached to a spacecraft structure at an inboard portion 230 by way of hinges 231 and 232.

In an embodiment, outboard portion 220 may be detachably engaged with structural element 210 by way of a "cup and cone" sheer fitting arrangement, whereby a substantially conical surface of outboard portion 220 engages a similarly conical "cup" surface 211 of structural element 210. When so engaged, for example by way of restraining rod or bolt 221, hold-down mechanism 200 may be operable to support the appendage, during a dynamic environment, at a first position substantially fixed with respect to the spacecraft. As a result, advantageously, hold-down mechanism 200, and not the positioning mechanism, reacts loads imparted by the spacecraft appendage.

In an embodiment, when the spacecraft appendage is to be released, restraining rod or bolt 221 may be cut or released by release device 203, whereupon frame 201 is free to rotate about hinge axis 233, defined by hinges 231 and 232. Advantageously, deployment spring 205 may be configured to drive rotation of frame 201 about hinge axis 233, so that hold-down mechanism 200 is automatically retracted from the spacecraft appendage. The spacecraft appendage, once hold-down mechanism 200 is retracted, may be coupled to the spacecraft only by the antenna positioning mechanism, which may thereby be enabled to steer the spacecraft appendage.

In an embodiment, when hold-down mechanism 200 is in the hold-down mode, the spacecraft appendage may be supported at a first position substantially fixed with respect to the spacecraft. Advantageously, in the first position, the spacecraft appendage may already be aligned in a nominal operating location and orientation, so that the antenna positioning mechanism is not required to initially deploy or otherwise reorient the appendage.

In an embodiment, release device 203 may be a pyrotechnic bolt or rod cutter, for example. Advantageously, release device 203 may be a non-pyrotechnic device, such as a split-spool device.

Figure 2C:
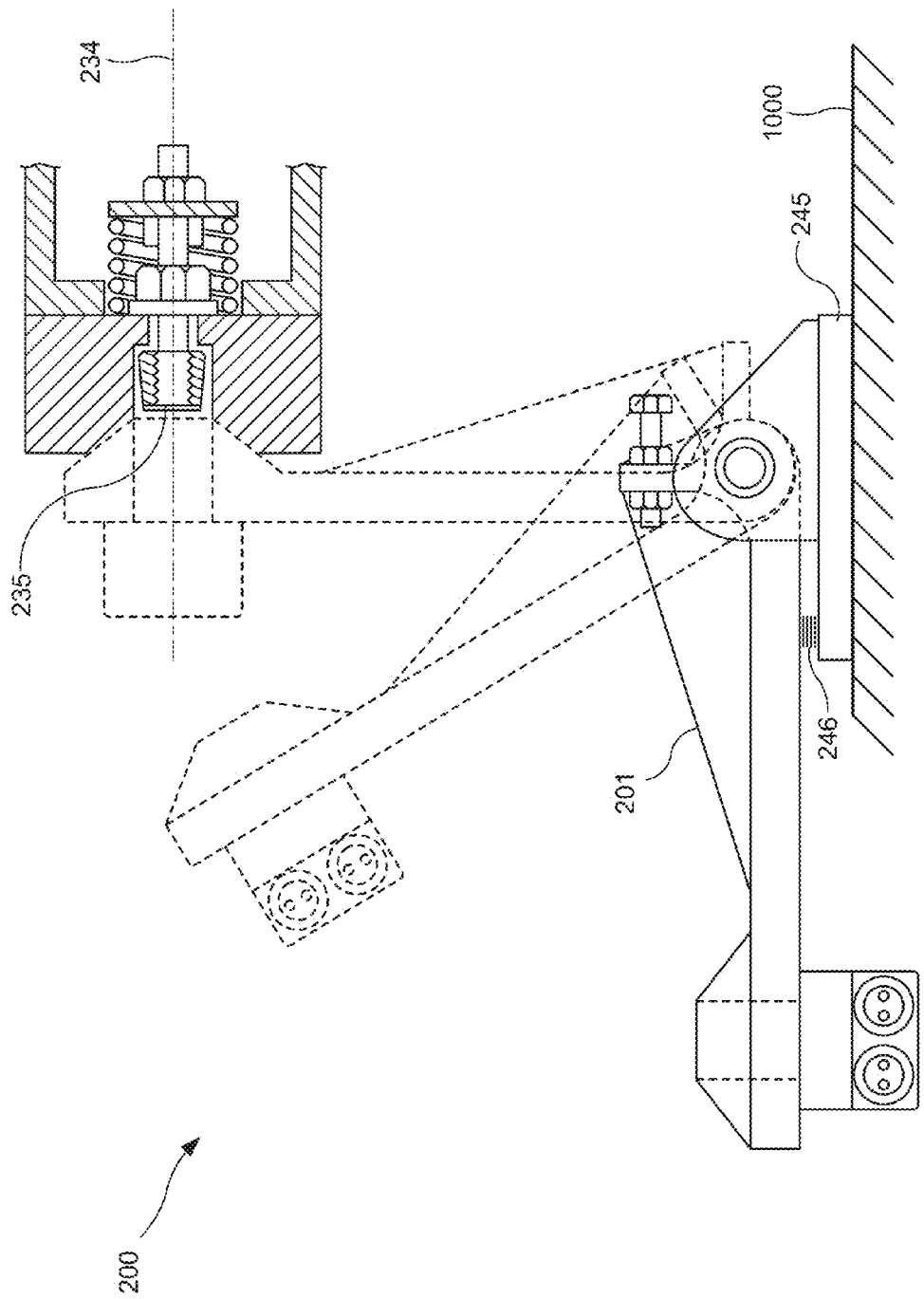

Referring now to FIG. 2C, it is illustrated how, following cutting or releasing restraining rod or bolt 221, hold down mechanism 200 may be retracted away from structural element 210. In an embodiment, cup and cone sheer fitting arrangement has a longitudinal axis 234 and a separation interface 235. Advantageously, longitudinal axis 234 is perpendicular to a plane that passes through separation interface 235 and hinge axis 233. In an embodiment, hinges 231 and 232 may be mechanically secured to spacecraft structural surface 1000. For example, an inboard mounting plate 245 may be configured to be mounted to spacecraft structural surface 1000. Advantageously, a deployment stop 246 may be provided to prevent over rotation of hold-down mechanism 200.

In some implementations, a number of hold-down mechanisms may be provided for a single steerable spacecraft appendage that is coupled to a spacecraft structure with a positioning mechanism. The hold-down mechanisms may be configured to support the appendage, during a dynamic environment, at a first position substantially fixed with respect to the spacecraft. Further, the hold-down mechanisms may be configured to release the appendage, thereby enabling the positioning mechanism to steer the spacecraft appendage; and retract from the appendage without regard to whether the appendage remains substantially in the first position.

Figures 3A, 3B:
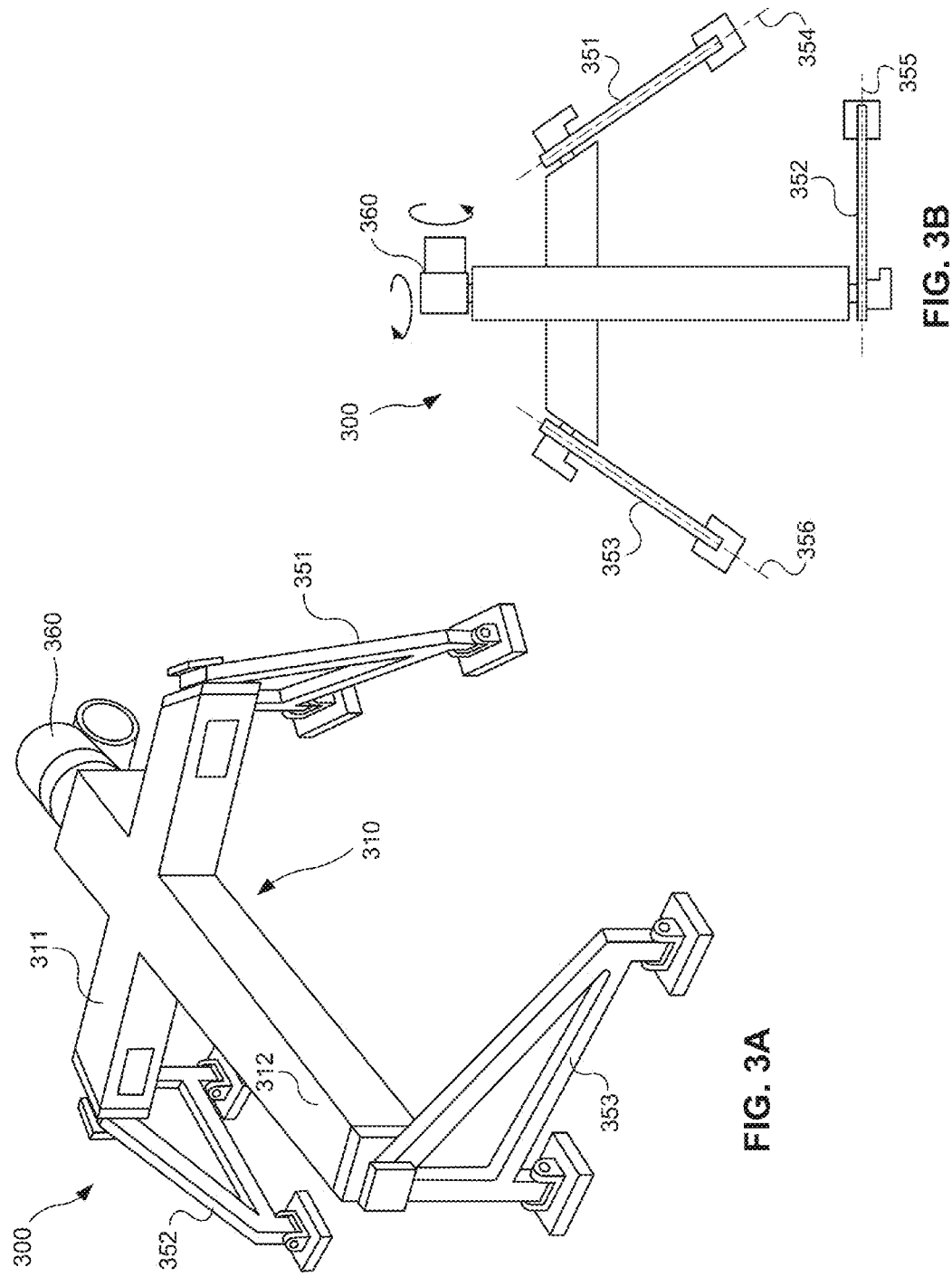
FIG. 3 illustrates an example of an arrangement of hold-down mechanisms according to an implementation of the disclosed techniques.

For example, referring now to FIGS. 3A and 3B, a hold-down arrangement 300 is illustrated of an embodiment where three hold-down mechanisms 351, 352, and 353 are configured to support, when in a "hold-down" mode, structural element 310 of a spacecraft appendage (not illustrated) in a first position. In an embodiment, the steerable spacecraft appendage may be an antenna reflector, and the structural element may be a reflector backup structure. FIG. 3A illustrates an isometric view of view of hold-down arrangement 300, whereas FIG. 3B illustrates what may be termed a plan view of hold-down arrangement 300. In the illustrated embodiment, structural element 310 is configured in a cruciform arrangement of a first longitudinal member 311 and a second longitudinal member 312. A first end of first longitudinal member 311 may have an interface to a first respective frame of hold-down mechanisms 351, and a second end of first longitudinal member 311 may have an interface to a second respective frame of hold-down mechanisms 352. A first end of second longitudinal member 312 may have an interface to a third respective frame of hold-down mechanisms 352. A second end of second longitudinal member 312 may have an interface to positioning mechanism 360.

In an embodiment, each respective frame of hold-down mechanisms 351, 352, and 353 is hingedly attached about a respective hinge axis 354, 355, and 356. The respective hinge axes may or may not be disposed in a common plane. In an embodiment however, at least a projection of each hinge axis into a common plane defines a triangle. Advantageously, the triangle may be an equilateral triangle.

In an embodiment, arrangement 300 may be configured such that, upon receiving a signal to release the appendage, respective hold-down mechanisms 351, 352, and 353 retract from the spacecraft appendage, thereby enabling the positioning mechanism to steer the spacecraft appendage, without regard to whether the appendage remains substantially in the first position.

Figure 4B:
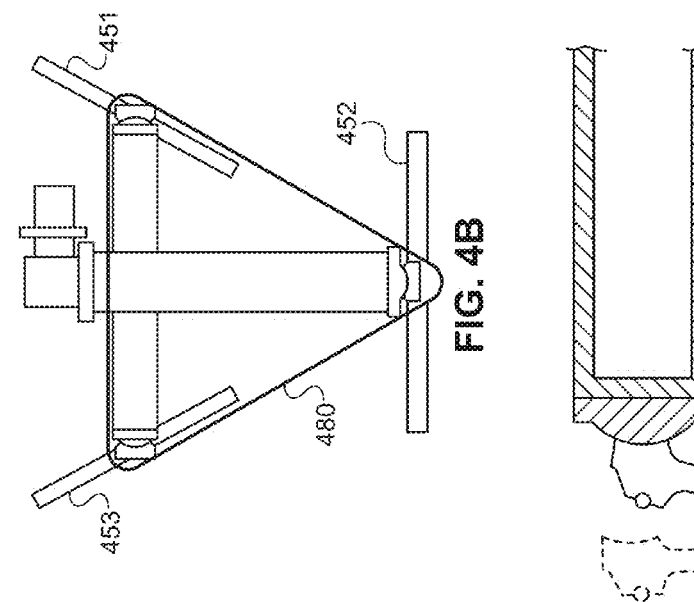
FIG. 4 illustrates a further example of an arrangement of hold-down mechanisms according to an implementation of the disclosed techniques
Figure 4C:
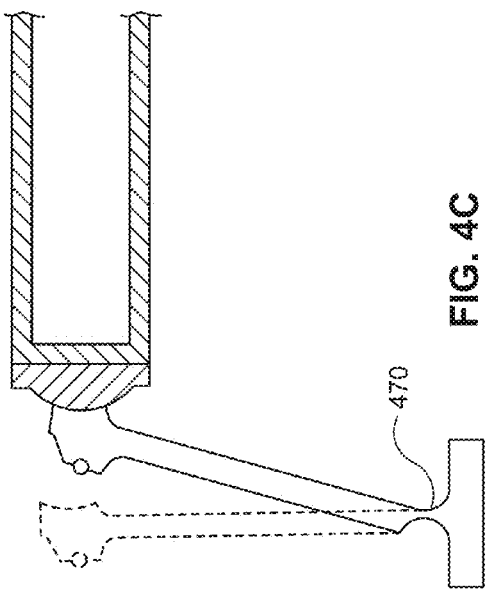
Figure 4A:
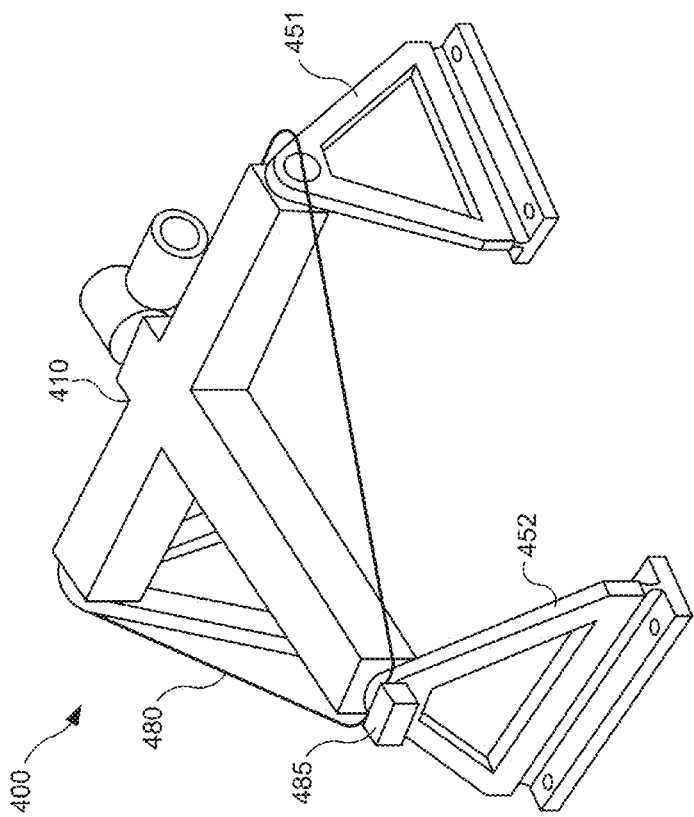

Referring now to FIGS. 4A, 4B, and 4C, in some implementations, a respective frame of one or more hold-down mechanisms may be attached, at an inboard portion, to the spacecraft structure and detachably engaged, at an outboard portion, to a structural element of the appendage, where each frame includes a flexure 470. Advantageously, flexure 470 may be pretensioned such that, upon release of the appendage, the flexure drives a rotation of a respective frame about a flexure axis, thereby causing the hold-down mechanism to retract from the appendage. In the illustrated arrangement 400, for example, three hold-down mechanisms 451, 452, and 453, each including a respective frame having a flexure, may be disposed to support a cruciform-shaped structural element. In an embodiment, each hold-down mechanism may include a respective frame that is detachably engaged, at an outboard portion, to a respective interface of structural element 410 of the appendage. A release device may be configured to prevent, in a first state, relative motion of the appendage with respect to the hold-down mechanisms, and, in a second state, permit relative motion of the appendage with respect to the hold-down mechanisms. Advantageously, the release device may include a cable 480 configured, in the first state, to tension each frame so as to ensure engagement of the frame with structural element 410. In an embodiment, the release device includes a cable cutter 485 configured, to cut, upon receipt of a signal, cable 480, thereby permitting each frame to retract from structural element 410. Advantageously, multiple hold-down mechanisms may be released by cutting a single cable.

Figure 5:
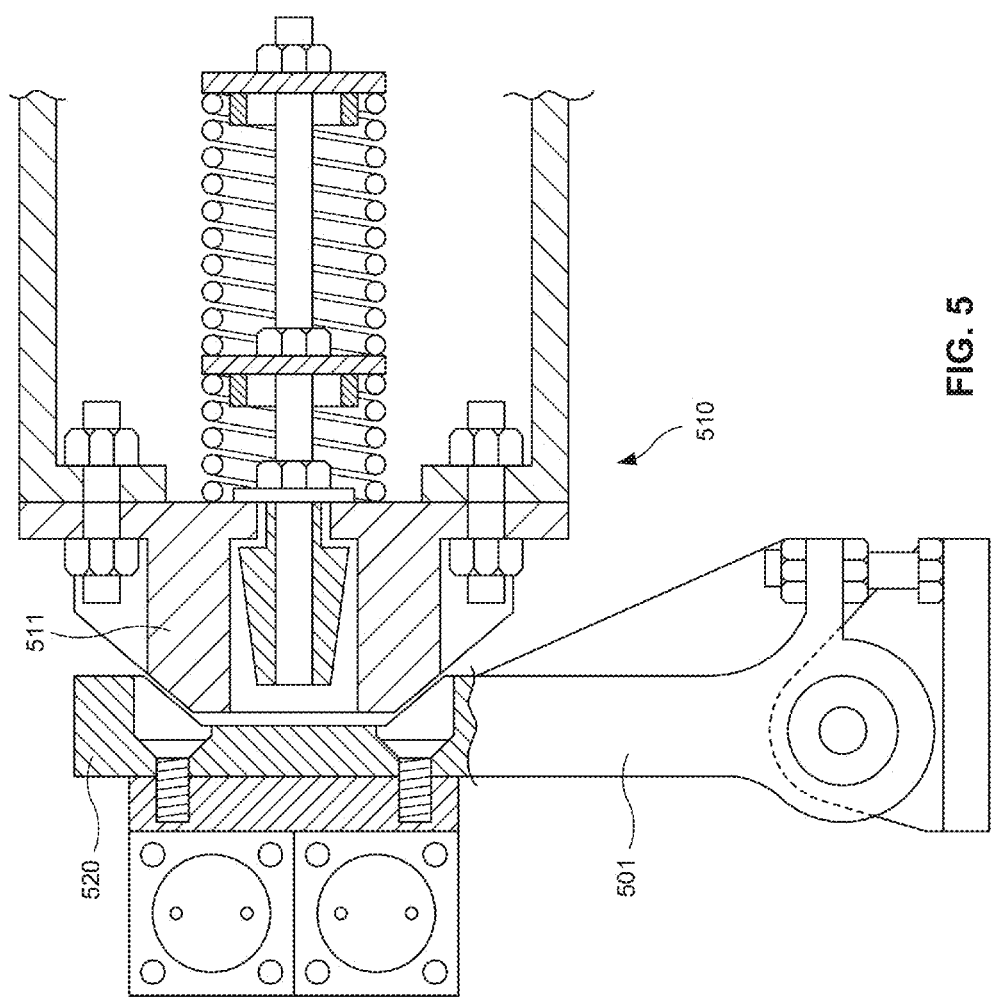
FIG. 5 illustrates an example of a hold-down mechanism according to an implementation of the disclosed techniques

As noted above, in some embodiments, an outboard portion of a frame may be detachably engaged with a structural element of a spacecraft appendage by way of a "cup and cone" sheer fitting arrangement. Referring now to FIG. 5, in an embodiment, a substantially conical surface of structural element 510 may be engaged by a similarly conical "cup" surface 511 of outboard portion 520 of frame 501.

Figure 6:
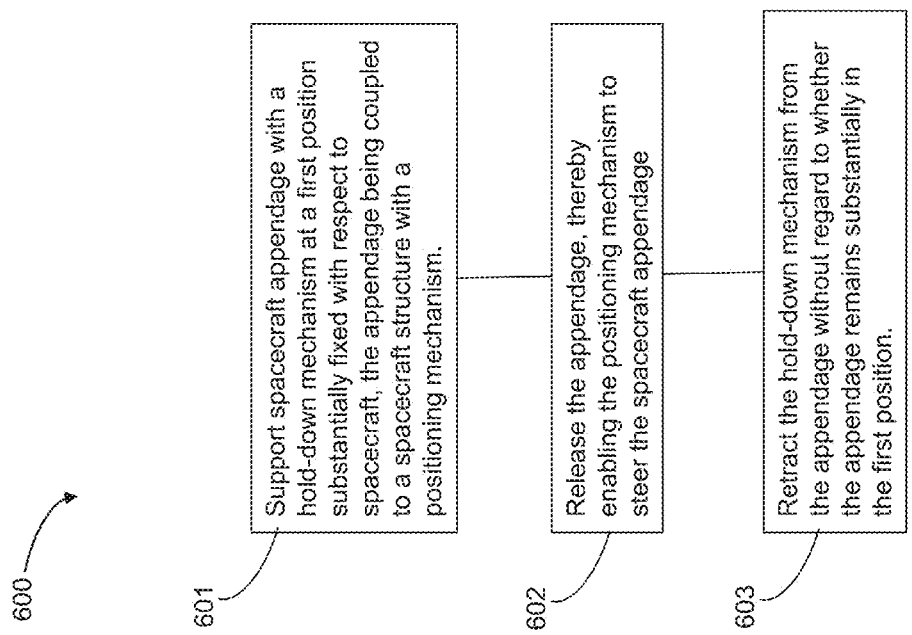
FIG. 6 illustrates a method of holding down and releasing a spacecraft appendage Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

Referring now to FIG. 6 a method 600 for holding down and releasing a spacecraft appendage is illustrated. At block 601 the spacecraft appendage is supported with a hold-down mechanism, during a first time period, at a first position substantially fixed with respect to the spacecraft, the appendage being coupled to a spacecraft structure with a positioning mechanism. At block 602, the appendage is released, thereby enabling the positioning mechanism to steer the spacecraft appendage. At block 603, the hold-down mechanism is retracted from the appendage without regard to whether the appendage remains substantially in the first position.

Thus, spacecraft appendage hold-down techniques been disclosed, whereby a spacecraft appendage is secured to the spacecraft, during launch and/or ground operations, by way of a hold-down mechanism that is configured to release the appendage without requiring the appendage to be moved away from the hold-down.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus comprising:
a hold-down mechanism for a steerable spacecraft appendage, said appendage being coupled to a spacecraft structure with a positioning mechanism; the hold-down mechanism comprising:
   a frame, hingedly attached, at an inboard portion, to the spacecraft structure, and detachably engaged, at an outboard portion, to a structural element of the appendage; and
   a deployment spring, said deployment spring configured such that, upon release of the appendage, the deployment spring drives a rotation of the frame about a hinge axis, thereby causing the hold-down mechanism to retract from the appendage; wherein:
   the frame is detachably engaged to the structural element of the appendage by a cup and cone arrangement, the cup and cone arrangement being characterized by a longitudinal axis and a separation interface, the longitudinal axis being perpendicular to a plane passing through the separation interface and the hinge axis, and
   the hold-down mechanism is configured to:
      support, when in a hold-down mode, the appendage at a first position substantially fixed with respect to the spacecraft, and isolate the positioning mechanism from loads imparted by the spacecraft appendage as a result of launch or other dynamic environment such that the loads are reacted by the hold-down mechanism and not the positioning mechanism;
      release, upon receipt of a signal, the appendage, thereby enabling the positioning mechanism to steer the spacecraft appendage; and
      retract from the appendage without regard to whether the appendage remains substantially in the first position.

2. The apparatus according to claim 1, wherein the hold-down mechanism is configured to retract from the appendage while the appendage remains substantially in the first position.

3. The apparatus according to claim 2, wherein the first position results in the spacecraft appendage being aligned in a nominal operating location and orientation, so that the positioning mechanism is not required to initially deploy or otherwise reorient the appendage.

4. The apparatus according to claim 1, wherein the hold down mechanism comprises a release device configured to prevent, in a first state, relative motion of the appendage with respect to the hold-down mechanism, and, in a second state, permit relative motion of the appendage with respect to the hold-down mechanism.

5. The apparatus according to claim 4, wherein the release device is a split-spool device.

6. The apparatus according to claim 4, wherein the release device is a pyrotechnic device.

7. The apparatus according to claim 1, wherein the frame comprises a convex cup configured to mate with a concave cone disposed on the structural element of the appendage.

8. The apparatus according to claim 1, wherein the frame comprises a concave cone configured to mate with a convex cup disposed on the structural element of the appendage.

9. An apparatus comprising:
a plurality of hold-down mechanisms for a steerable spacecraft appendage, said appendage being coupled to a spacecraft structure with a positioning mechanism; each of the hold-down mechanisms comprising:
   a frame, hingedly attached, at an inboard portion, to the spacecraft structure, and detachably engaged, at an outboard portion, to a structural element of the appendage; and
   a deployment spring, said deployment spring configured such that, upon release of the appendage, the deployment spring drives a rotation of the frame about a hinge axis, thereby causing the hold-down mechanism to retract from the appendage;
wherein:
each frame is detachably engaged to the structural element of the appendage by a cup and cone arrangement, the cup and cone arrangement being characterized by a longitudinal axis and a separation interface, the longitudinal axis being perpendicular to a plane passing through the separation interface and the hinge axis, and
the plurality of hold-down mechanisms are configured to:
   support the appendage, during a dynamic environment, at a first position substantially fixed with respect to the spacecraft, and isolate the positioning mechanism from loads imparted by the spacecraft appendage as a result of the dynamic environment such that the loads are reacted by the hold-down mechanisms and not the positioning mechanism;
   release, upon receipt of a signal, the appendage, thereby enabling the positioning mechanism to steer the spacecraft appendage; and
   retract from the appendage without regard to whether the appendage remains substantially in the first position.

10. The apparatus according to claim 9, wherein the apparatus comprises three hold down mechanisms, and the structural element comprises a cruciform arrangement of a first longitudinal member and a second longitudinal member, wherein
a first end of the first longitudinal member has an interface to a first respective frame, a second end of the first longitudinal member has an interface to a second respective frame, a first end of the second longitudinal member has an interface to a third respective frame, and a second end of the second longitudinal member has an interface to the positioning mechanism.

11. The apparatus according to claim 10, wherein each respective frame is hingedly attached about a respective hinge axis, and a projection of each hinge axis onto a common plane defines a triangle.

12. The apparatus of claim 11, wherein the triangle is an equilateral triangle.

13. The apparatus according to claim 9 wherein the steerable spacecraft appendage comprises an antenna reflector, and the structural element comprises a reflector backup structure.

14. The apparatus according to claim 9, wherein each hold down mechanism comprises a release device configured to prevent, in a first state, relative motion of the appendage with respect to the hold-down mechanism, and, in a second state, permit relative motion of the appendage with respect to the hold-down mechanism.

15. The apparatus according to claim 14, wherein the release device is a split-spool device.

16. The apparatus according to claim 14, wherein the release device is a pyrotechnic device.

17. A spacecraft appendage hold-down and release method comprising:

supporting a spacecraft appendage, with a hold-down mechanism, during a first time period, at a first position substantially fixed with respect to the spacecraft, said appendage being coupled to a spacecraft structure with a positioning mechanism, wherein supporting the spacecraft appendage includes isolating the positioning mechanism from loads imparted by the spacecraft appendage as a result of launch or other dynamic environment such that the loads are reacted by the hold-down mechanism and not the positioning mechanism;

releasing the appendage, subsequent to the first time period, thereby enabling the positioning mechanism to steer the spacecraft appendage; and retracting the hold-down mechanism from the appendage without regard to whether the appendage remains substantially in the first position; wherein:

the hold-down mechanism comprises:
    a frame, hingedly attached, at an inboard portion, to the spacecraft structure, and detachably engaged, at an outboard portion, to a structural element of the appendage; and
    a deployment spring, said deployment spring configured such that, upon release of the appendage, the deployment spring drives a rotation of the frame about a hinge axis, thereby causing the hold-down mechanism to retract from the appendage; and:

the frame is detachably engaged to the structural element of the appendage by a cup and cone arrangement, the cup and cone arrangement being characterized by a longitudinal axis and a separation interface, the longitudinal axis being perpendicular to a plane passing through the separation interface and the hinge axis.

18. The method according to claim 17, wherein the hold-down mechanism is configured to retract from the appendage while the appendage remains substantially in the first position.

19. The method according to claim 18, wherein the first position results in the spacecraft appendage being aligned in a nominal operating location and orientation, so that the positioning mechanism is not required to initially deploy or otherwise reorient the appendage.

20. The method according to claim 17, wherein the hold down mechanism comprises a release device configured to prevent, in a first state, relative motion of the appendage with respect to the hold-down mechanism, and, in a second state, permit relative motion of the appendage with respect to the hold-down mechanism.

21. The method according to claim 17, wherein a dynamic environment encountered during the first time period includes at least one of a launch environment and a spacecraft dynamic test environment.

* * * * *